US012026536B2

(12) United States Patent
Mani et al.

(10) Patent No.: US 12,026,536 B2
(45) Date of Patent: Jul. 2, 2024

(54) RIGHTSIZING VIRTUAL MACHINE DEPLOYMENTS IN A CLOUD COMPUTING ENVIRONMENT

(71) Applicant: Microsoft Technology Licensing, LLC, Redmond, WA (US)

(72) Inventors: Ajay Mani, Redmond, WA (US); Nisarg Sheth, Bothell, WA (US); Saad Syed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 16/911,144

(22) Filed: Jun. 24, 2020

(65) Prior Publication Data

US 2021/0406053 A1 Dec. 30, 2021

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| 10,970,123 | B1* | 4/2021 | Luciano | G06F 9/5016 |
| 11,138,049 | B1* | 10/2021 | Featonby | G06F 11/3447 |
| 2012/0131594 | A1 | 5/2012 | Morgan et al. | |
| 2016/0314014 | A1* | 10/2016 | Dow | G06N 20/00 |
| 2018/0225149 | A1 | 8/2018 | Bianchini et al. | |
| 2019/0163517 | A1* | 5/2019 | Fontoura | G06F 9/5005 |
| 2021/0073034 | A1* | 3/2021 | Bliesner | G06Q 30/0641 |

FOREIGN PATENT DOCUMENTS

WO 2019099281 A1 5/2019

OTHER PUBLICATIONS

Li, et al., "A Live Migration Strategy for Virtual Machine Based on Performance Predicting", In Proceedings of the International Conference on Computer Science and Service System, Aug. 11, 2012, pp. 72-76.

"International Search Report and Written Opinion Issued in PCT Application No. PCT/US21/032122", dated Aug. 9, 2021, 12 Pages. (Ms# 408487-WO-PCT).

* cited by examiner

*Primary Examiner* — Jacob D Dascomb
(74) *Attorney, Agent, or Firm* — Ray, Quinney & Nebeker; James S. Bullough

(57) ABSTRACT

The present disclosure relates to systems, methods, and computer readable media for rightsizing virtual machine deployments on a cloud computing system. For example, systems disclosed herein may predict utilization of resources for a customer deployment and determine a desired goal state including a deployment of virtual machines having rightsized specifications that align more closely with the predicted utilization. Systems disclosed herein may utilize the goal state in view of the deployment data, policies, and other information to determine an action plan including deployment actions for transitioning a current state of a customer deployment to the goal state. By rightsizing virtual machine deployments, systems described herein may affect more efficient utilization of cloud computing resources and decrease costs associated with over-allocation of cloud computing resources.

20 Claims, 8 Drawing Sheets

RIGHTSIZING VIRTUAL MACHINE DEPLOYMENTS IN A CLOUD COMPUTING ENVIRONMENT

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. For instance, many cloud computing services are partitioned into clusters of nodes (e.g., node clusters). Cloud computing systems often make use of different types of virtual services (e.g., computing containers, virtual machines) that provide remote storage and computing functionality to various clients or customers. These virtual services can be hosted by server nodes on a cloud computing system.

As cloud computing continues to grow in popularity, managing different types of services and providing cloud-based resources to customers has become increasingly difficult. For example, in an effort to ensure that sufficient resources are readily available, customers will often request or subscribe to have access to a quantity of resources beyond an immediate need. As a result, cloud computing providers will often over-allocate computing resources to customers that end up underutilizing a subscription. This often results in customers overpaying for cloud computing resources.

In addition to customers paying more than needed, this underutilization of allocated resource often results in inefficient utilization of computing resources. For example, oversubscribing cloud resources often results in a significant number of compute cores that are left unused. Moreover, oversubscribing cloud resources often causes fragmentation of cloud computing capacity across server nodes of a node cluster. This fragmentation can cause various allocation failures for new and existing allocations even where computing resources are technically available. Further, this fragmentation limits the ability of the cloud computing system to perform updates and/or recover from various types of hardware and software failures.

Moreover, as cloud computing technology develops, new and improved virtual machines are deployed and updated hardware having enhanced capabilities are made available. However, the static nature of many deployments often prevents customers from taking advantage of or otherwise experiencing the benefits of updated hardware and/or software on the cloud. As a result, conventional systems for deploying customer subscriptions often fail to take advantage of updated technology in a way that is mutually beneficial to customers and cloud resource providers.

These and other problems exist in connection with deploying customer subscriptions on cloud computing systems.

DETAILED DESCRIPTION

Figure 1:
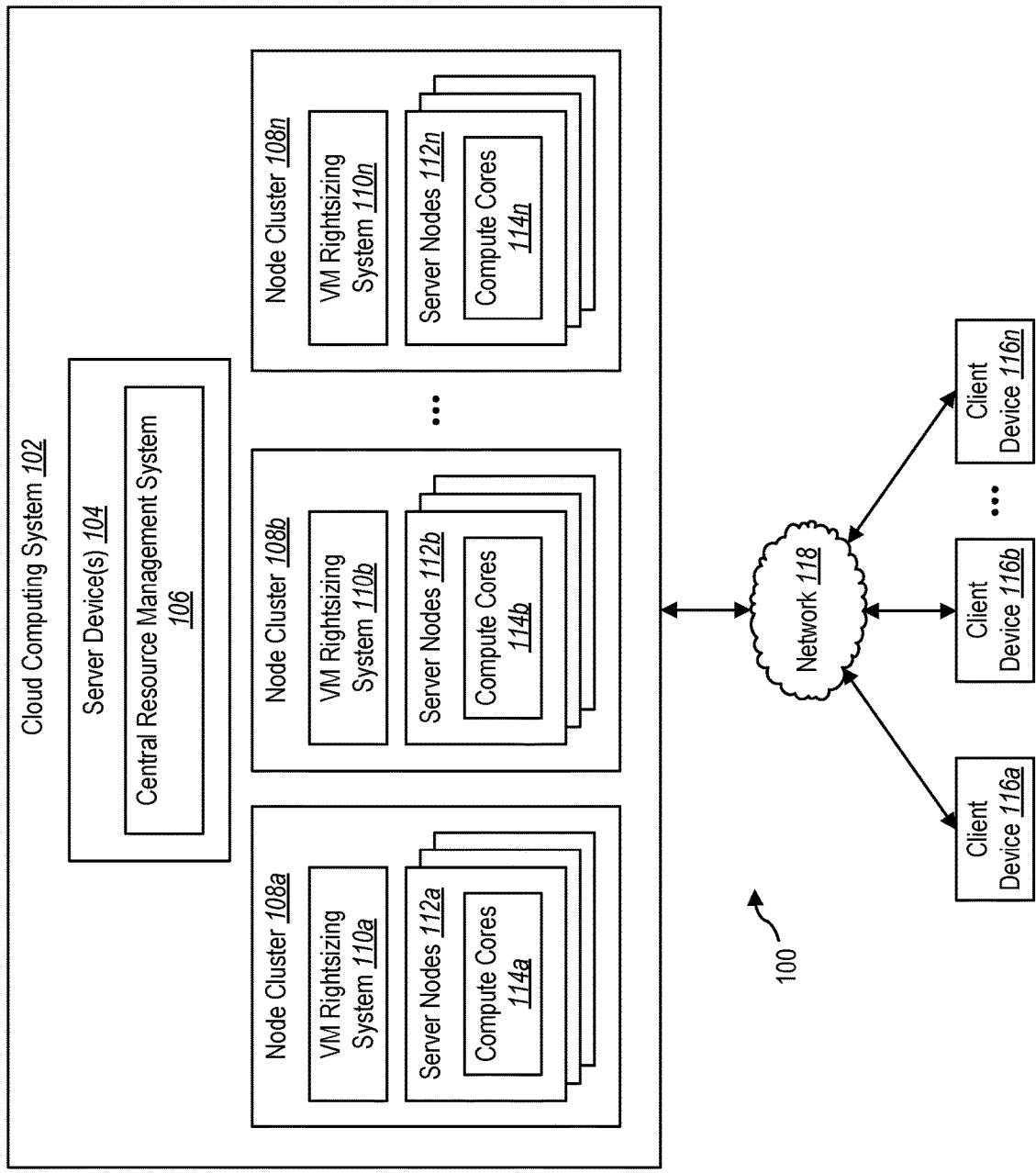
FIG. 1 illustrates an example environment of a cloud computing system including systems for rightsizing deployments of virtual machines in accordance with one or more embodiments.

The present disclosure is generally related to rightsizing a deployment of virtual machines to better align with utilization of a customer subscription and/or deployment of virtual machines and other services on a cloud computing system. In particular, based on a predicted utilization of resources for a customer subscription, systems described herein generate a goal state including an identification of virtual machines that aligns with the predicted utilization of resources. As will be discussed herein, the goal state may include a different set of virtual machines than a current set of virtual machines deployed on the cloud computing system. The systems described herein may further generate an action plan that facilitates a transition from a current state of the subscription to the goal state using a variety of deployment actions in a way that limits a negative customer impact. One or more implementations described herein limits negative customer impacts while also improving efficiency of utilizing cloud computing resources.

By way of example, and as will be discussed in further detail below, this disclosure describes a virtual machine rightsizing system implemented on a node cluster. The virtual machine rightsizing system may provide deployment data for a customer subscription associated with a deployment of a first set of virtual machines on a cloud computing system. The virtual machine rightsizing system may receive a goal state of the customer subscription that includes or otherwise identifies a second set of virtual machines having rightsized specifications (e.g., a rightsized set of virtual machines). The virtual machine rightsizing system can generate an action plan including various deployment actions for transitioning a current state of the customer subscription to the goal state. The virtual machine rightsizing system can further cause the second set of virtual machines to be allocated in accordance with the action plan.

As a further example, and as will be discussed in further detail below, this disclosure describes a central resource management system implemented on a server device(s) of the cloud computing system. The central resource management system may receive or otherwise access deployment data for a customer subscription associated with a first set of virtual machines on a node cluster. The central resource management system may further identify a trigger condition associated with a predicted mismatched utilization (e.g., underutilization) of available computing resources allocated for the first set of virtual machines. The central resource management system may generate a goal state based on the deployment data that includes or otherwise identifies a second set of virtual machines having rightsized specifications that align more closely with a predicted utilization of resources by customer(s) of the customer subscription. The central resource management system may further provide the goal state to a node cluster that causes the node cluster (e.g., a virtual rightsizing system implemented on the node cluster) to transition the customer subscription from a current state to the goal state.

The present disclosure includes a number of practical applications that provide benefits and/or solve problems associated with rightsizing virtual machines in a way that aligns more closely with utilization of a customer subscription by one or more customers (e.g., internal and/or external customers) of the cloud computing system. Examples of these applications and benefits are discussed in further detail below.

For example, by predicting resource utilization and generating a goal state that includes a set of virtual machines having rightsized specifications, the systems described herein enable allocations for deployments on the cloud computing system to align more closely to utilization of cloud computing resources. This process of rightsizing virtual machine deployments in accordance with one or more embodiments described herein facilitates efficient utilization of cloud computing resources. Moreover, this enables customers (internal and/or external customers) to avoid overpaying for computing resources.

In addition, by providing a goal state and generating an action plan, the systems described herein can identify a series and/or sequence of actions that enables a customer subscription to transition between deployment states while limiting a negative impact to a customer. For example, systems described herein can identify and perform a variety of deployment actions based on characteristics of virtual machines and/or specific services in an effort to minimize a negative impact. The systems described herein may further enable transition between deployment states in a gradual way and/or in accordance with a specific sequence of actions that adheres to a fault domain of an existing deployment.

Moreover, identifying a trigger condition and generating a goal state responsive to the trigger condition provides enhanced flexibility in utilizing new or updated resources of the cloud computing system. In particular, features and functionality described herein enables a customer deployment to take advantage of new hardware and/or new software that becomes available on the cloud computing system. For instance, in addition to rightsizing resources to better align with projected utilization, a trigger condition that prompts generation of the goal state may further be based on availability of new hardware that provides faster and more reliable computing resources. Moreover, systems described herein enable transition from an existing set of virtual machines to new virtual machine type or family that may have different features and functionality that provide better and/or more reliable services to a customer.

As illustrated in the foregoing discussion, the present disclosure utilizes a variety of terms to describe features and advantages of the systems herein. Additional detail is now provided regarding the meaning of some example terms.

For example, as used herein, a "cloud computing system" refers to a network of connected computing devices that provide various services to customer devices (e.g., client devices, network devices). For instance, as mentioned above, a distributed computing system can include a collection of physical server devices (e.g., server nodes) organized in a hierarchical structure including clusters, computing zones, virtual local area networks (VLANs), racks, fault domains, etc. In addition, it will be understood that while one or more specific examples and implementations described herein relate specifically to "clusters" or "node clusters" of server nodes, features and functionality described in connection with one or more node clusters can similarly relate to racks, regions of nodes, datacenters, or other hierarchical structures in which network devices are grouped together. The cloud computing system may refer to a private or public cloud computing system.

As used herein, "deployment data" may refer to any information associated with a deployment for a customer subscription on a cloud computing system. The deployment data may include features and characteristics of virtual machines including an identification of a service or application provided by one or more virtual machines. The deployment data may further include an indicated family or type of virtual machine that the customer subscription includes. In addition to features and characteristics of the virtual machines, the deployment data may include utilization data (e.g., historical utilization, utilization trends) associated with a number of server nodes and/or compute cores utilized over time in connection with the customer subscription. The utilization data may further include fragmentation characteristics indicating a shape of resource utilization, such as a number of empty nodes and/or percentage of node cores in use by the virtual machines and/or server nodes on which the virtual machines are implemented. The deployment data may include trends of utilization over time as well as predicted trends of utilization for an upcoming period of time.

As used herein, a "deployment," "customer deployment," or "tenant deployment" may refer interchangeably to one or more associated services and allocations provided by a cloud computing system in connection with customer subscription. For example, a deployment may refer to one or multiple services and/or applications provided to or otherwise accessible to a customer (or multiple customers associated with a customer subscription) using computing resources within a node cluster or other network unit having defined boundary or computing zone. A deployment may refer to one or more virtual machines deployed on server nodes of a node cluster.

As used herein, a "current deployment" or "existing deployment" may refer to a deployment that has been previously permitted and which is currently located on a node cluster. Thus, as used herein, a current state of a deployment may refer to a deployment as it currently exists on the cloud computing system. In one or more embodiments described herein, a deployment refers exclusively to related services (e.g., virtual machines) and allocations within a single node cluster.

As used herein, a "customer subscription" may refer to parameters and information that define the terms and policies of a customer deployment. For instance, a customer subscription may include a set of virtual machines (or multiple sets of different types of virtual machines) and associated specifications in accordance with terms or policies selected by a customer. In one or more embodiments, a customer subscription includes a deployment template that identifies specifications of virtual machines including, by way of example, a number of compute cores, a number of virtual machine instances, bandwidth resources, computing resources, storage resources, service availability guarantees, etc. A customer subscription may indicate upper limits of computing resources to be allocated on a per-instance or per-service basis. The customer subscription may further include billing information based on resource usage and/or upper limits allocated for a customer deployment. In one or more embodiments, a customer subscription includes one or more user preferences or permissions associated with modifying the customer subscription and/or policies permitting performance of one or more deployment actions. For example, a customer subscription may include a preference or setting for auto-enrolling or opting out of rightsizing in accordance with one or more embodiments described herein.

As used herein, a "state" of a customer subscription may refer to a status or set of policies that define the customer subscription at a specific point in time. For example, a current state of a customer subscription may refer to a status of the customer subscription or a deployment of virtual machines as it exists at a current time. This may include any information about virtual machines, policies, payment data, a deployment template, or other deployment data corresponding to the customer subscription at the current time. In one or more embodiments, a goal state may be used to describe a desired state or target state of the customer subscription in which one or more permissions, parameters, policies, or other information from the customer subscription differs from a current state. Additional information in connection with states of a customer subscription will be discussed in further detail below.

As used herein, a "virtual machine" refers to an emulation of a computer system on a server node that provides functionality of one or more applications or services on the cloud computing system. Virtual machines can provide functionality needed to execute one or more operating systems. In addition, virtual machines can make use of hypervisors on processors of server devices that support virtual replication of hardware. It will be understood that while one or more specific examples and implementations described herein relate specifically to virtual machines, features and functionality described in connection with predicting failed virtual machine allocations may similarly refer to predicting failure of allocation for a variety of machine-types and services.

As used herein, a "core," "compute core," or "node core" may refer interchangeably to a computing resource or unit of computing resources provided via a computing node (e.g., a server node) of a cloud computing system. A compute core may refer to a virtual core that make use of the same processor without interfering with other virtual cores operating in conjunction with the processor. Alternatively, a compute core may refer to a physical core having a physical separation from other compute cores. Compute cores implemented on one or across multiple server nodes may refer to a variety of different cores having different sizes and capabilities. A server node may include one or multiple compute cores implemented thereon. Furthermore, a set of multiple cores may be allocated for hosting one or multiple virtual machines or other cloud-based services.

Additional detail will now be provided regarding examples of various systems in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 may include one or more server device(s) 104 having a central resource management system 106 implemented thereon. As will be discussed in further detail, the central resource management system 106 may collect deployment data and determine a goal state for a customer subscription that more closely aligns with a predicted utilization of computing resources on a given node cluster.

In one or more embodiments, the central resource management system 106 is implemented as part of a more comprehensive central resource architecture or service(s). For example, the central resource management system 106 may include any number of subsystems configured to generate and provide information on various policies such as new allocations, predictions of various allocation failures, general capacity and utilization predictions, virtual migration impact metrics, or any other information related to management of resources on the cloud computing system 102. Accordingly, while one or more embodiments described herein relate specifically to feature and functionality related to collecting deployment data for use in predicting resource utilization and generating a goal state that aligns with the predicted resource utilization, the central management system may include a number of features and functionalities not discussed herein in connection with managing resources and other aspects on the different node clusters 108a-n.

As shown in FIG. 1, in addition to the server device(s) 104, the cloud computing system 102 may include any number of node clusters 108a-n. One or more of the node clusters 108a-n may be grouped by geographic location (e.g., a region of node clusters). In one or more embodiments, the node clusters 108a-n are implemented across multiple geographic locations (e.g., at different datacenters or on different racks including one or multiple node clusters).

Each of the node clusters 108a-n may include a variety of server nodes 112a-n having a number and variety of compute cores 114a-n. In addition, one or more virtual machines or other cloud computing resources and services may be implemented on the compute cores 114a-n of the server nodes 112a-n. For example, a first node cluster 108a may include a virtual machine rightsizing system 110a tasked with rightsizing virtual machines of a current deployment from a current state to a goal state received from the central resource management system 106. For example, as will be discussed in further detail below, the virtual machine rightsizing system 110a may include a deployment action engine and a tenant manager that cooperatively generate an action plan for transitioning a current state of a customer subscription (e.g., a current state of a deployment) to a determined goal state of the customer subscription (e.g., a goal state of the deployment).

As further shown in FIG. 1, the first node cluster 108a may include a first set of server nodes 112a. Each node from the first set of server nodes 112a may include one or more compute core(s) 114a. One or more of the compute cores 114a may include virtual machines and/or other cloud computing services implemented thereon. In one or more embodiments, the first node cluster 108a may include allocated resources and services for a set of customer deployments currently deployed on the node cluster 108a. The server node(s) 112a may host a number and a variety of virtual machines and other services. As shown in FIG. 1, the cloud computing system 102 may include multiple node clusters 108a-n. Each of the node clusters 108a-n may include virtual machine rightsizing systems 110a-n, server nodes 112a-n, and compute cores 114a-n.

As shown in FIG. 1, the environment 100 may include a plurality of client devices 116a-n in communication with the cloud computing system 102 (e.g., in communication with different server nodes 112a-n via a network 118). The client devices 116a-n may refer to various types of computing devices including, by way of example, mobile devices, desktop computers, server devices, or other types of computing devices. The network 118 may include one or multiple networks that use one or more communication platforms or technologies for transmitting data. For example, the network 118 may include the Internet or other data link that enables transport of electronic data between respective client devices 116a-n and devices of the cloud computing system 102.

As mentioned above, one or more resources (e.g., virtual machines) of a first node cluster 108a (or other node cluster from the plurality of node clusters 108a-n) may include resources including one or multiple compute cores occupied or otherwise in use by a customer. For example, a first deployment may refer to one or multiple virtual machines on the same server node or across multiple server nodes that provides access to a large-scale computation application to a user of the first client device 116a (or multiple client devices). As another example, a second deployment may refer to one or more virtual machines on the same server node or across multiple server nodes that provides access to a gaming application to a second client device 116b (or multiple client devices).

Moreover, while FIG. 1 illustrates an example in which customers access services of the cloud computing system 102 via client devices 116a-n, one or more embodiments described herein may include clients on the cloud computing system 102. In each example, the client(s) and/or client devices 116a-n may be associated with internal clients associated with the same entity as an owner or administrator of the cloud computing system 102 or, alternatively, external clients including end-users or other entities independent from an owner or administrator of the cloud computing system 102.

As mentioned above, the central resource management system 106 and the virtual machine rightsizing system(s) 110a-n may cooperatively perform features and functionalities described herein in connection with rightsizing virtual machines of a deployment in accordance with one or more embodiments described herein. Additional detail in connection with an example implementation showing the central resource management system 106 and a virtual machine rightsizing system 110 on a single node cluster will be discussed in connection with FIG. 2.

Figure 2:
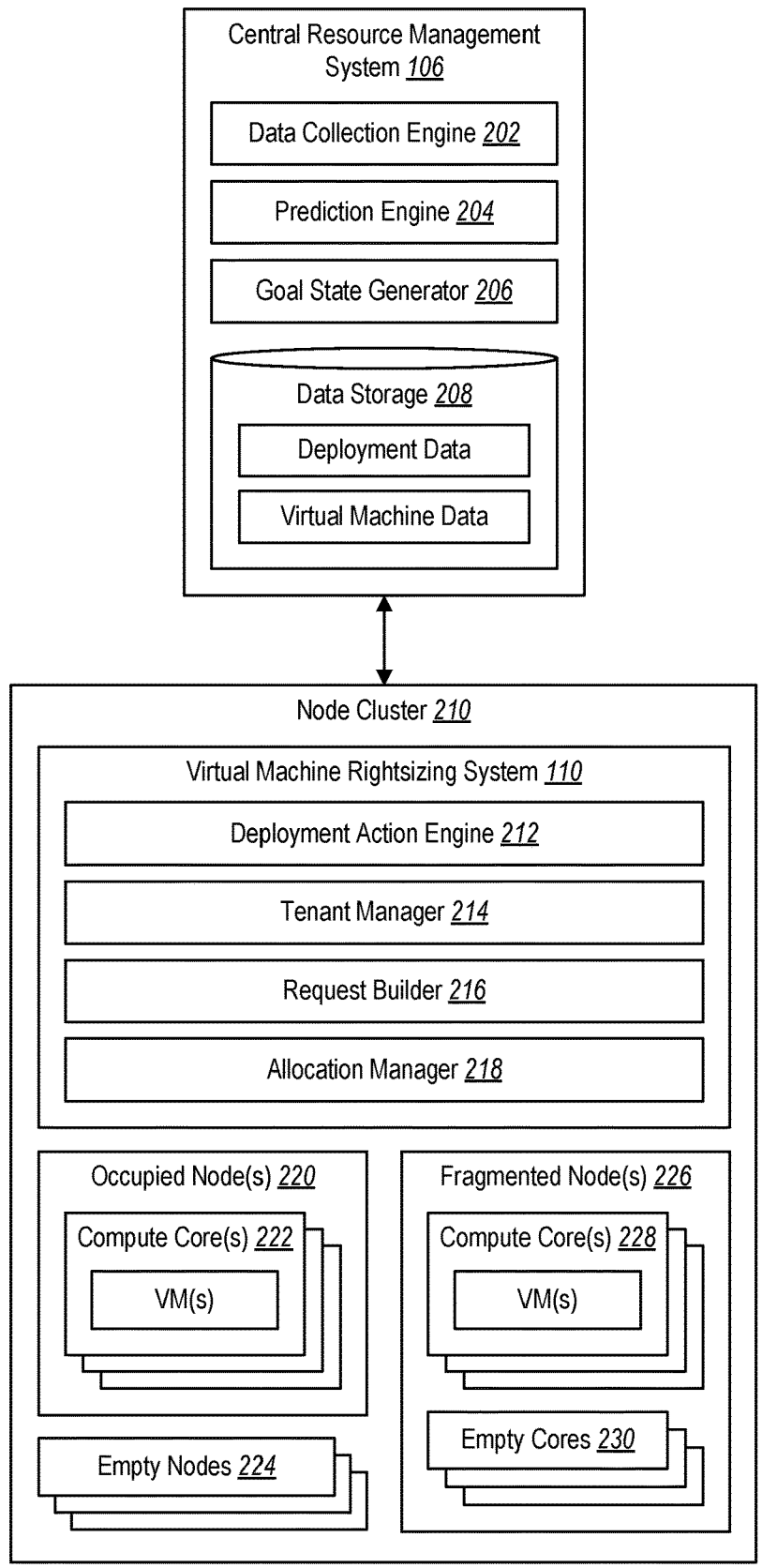
FIG. 2 illustrates an example in which systems for rightsizing deployments of virtual machines on a node cluster are implemented in accordance with one or more embodiments.

It will be noted that while FIGS. 1-2 illustrate rightsizing virtual machines of a deployment implemented on server nodes of an example cluster, features and functionality of the virtual machine rightsizing system 110 may similarly be implemented in connection with a deployment on a different network unit or organization of networked devices. For instance, while one or more embodiments described herein relate to a node cluster, similar features may apply to rightsizing of virtual machines on a specific server rack, a virtual network (e.g., a VNET), a specific availability zone, or other set of computing resources including server nodes and compute cores capable of being reserved or allocated for deployment of the virtual machines thereon.

FIG. 2 illustrates an example implementation in which a central resource management system 106 and virtual machine rightsizing system 110 cooperatively perform features and functionality related to rightsizing virtual machines of a customer deployment. In particular, the central resource management system 106 and virtual machine rightsizing system 110 may cooperatively facilitate transition of a deployment from a current state to a goal state having a set of rightsized virtual machines that more closely align with utilization of resources by the customer deployment on the cloud computing system.

It will be noted that FIG. 2 illustrates an implementation in which the central resource management system 106 and a virtual machine rightsizing system 110 on a single node cluster cooperatively implement rightsizing of a deployment on the node cluster by way of example and not limitation.

For example, features and functionality discussed in connection with the illustrated example in FIG. 2 may similarly apply to any of the multiple node clusters 108a-n of the cloud computing system 102 discussed above in connection with FIG. 1. In addition, as mentioned above, features and functionality described in connection with rightsizing virtual machines for a deployment on a node cluster may similarly apply to other groupings of networked devices (e.g., computing zones, virtual networks, etc.).

As shown in FIG. 2, a central resource management system 106 may include a data collection engine 202, a prediction engine 204, and a goal state generator 206. The central resource management system 106 may additionally include a data storage 208 having various types of data accessible to the components 202-206 of the central resource management system 106. For example, the data storage 208 may include deployment data associated with corresponding customer subscriptions. The data storage 208 may further include virtual machine data associated with virtual machine types and families that may be deployed on various server nodes.

As just mentioned, the central resource management system 106 may include a data collection engine 202. The data collection engine 202 may collect, receive, or otherwise obtain deployment data for customer deployment(s) on the node cluster 210. For instance, the data collection engine 202 may receive data locally collected by an agent on the node cluster 210 or on respective nodes of the node cluster 210. In one or more embodiments, the data collection engine 202 accesses deployment data from a data store or other source where deployment data is maintained and accessible to the data collection engine 202.

As indicated above, the central resource management system 106 additionally includes a prediction engine 204. The prediction engine 204 may receive data collected by the data collection engine 202 and determine a predicted utilization of customer deployment(s). For instance, the prediction engine 204 may process the deployment data to determine a number of compute cores that a customer deployment will use over time or, more specifically, a number of compute cores that each virtual machine is expected to use over time. The prediction engine 204 may further identify trends of predicted usage over time including short-term predictions (e.g., intra-day utilization trends) and longer term predictions (e.g., cross-day utilization, utilization growth over time) of how cloud computing resources will be used by users or owners (e.g., customers) of a customer deployment.

The central resource management system 106 may further include a goal state generator 206. The goal state generator 206 may identify or otherwise determine a goal state including any number of modifications to an existing customer deployment that would align more closely with the predicted utilization of computing resources. For instance, the goal state generator 206 may query virtual machine data (e.g., from the data storage 208) to determine alternative virtual machine types having policies, settings, or resource limits that more closely align with current utilization patterns and/or a predicted utilization of computing resources by customers associated with a customer subscription.

As mentioned above, the data storage 208 may include various types of information. For instance, the data storage 208 may include deployment data. As indicated above, the deployment data may include any information associated with a customer deployment and/or customer subscription. For example, the deployment data may include utilization data that the prediction engine 204 uses to determine a predicted utilization of resources over time. The deployment data may further include policies or parameters defined by the customer subscription indicating resource limits for a deployment of virtual machines. The deployment data may further include historical utilization trends over time and/or predicted trends of utilization over time.

As further shown, the data storage 208 may include virtual machine data. While the deployment data may specifically include information about a set of virtual machines of a current customer deployment, the virtual machine data may include information about any number of possible virtual machines that may be deployed on the node cluster 210. For example, the virtual machine data may include a listing or database of virtual machine families or virtual machine types corresponding to a variety of virtual machine specifications. The virtual machine data may further include compatibility data indicating which virtual machine types are compatible with one another (e.g., which virtual machines are interchangeable in various scenarios) and/or which virtual machines are configured to host different types of applications and/or services. For instance, the virtual machine data may indicate a subset of virtual machines from a collection of virtual machines that are configured to host a specific type of service (e.g., computing application, storage application). In one or more embodiments, the virtual machine data may indicate types of virtual machines or virtual machine families that may be hosted on specific generations of server nodes and/or compute cores.

As shown in FIG. 2, a virtual machine rightsizing system 110 is implemented on an example node cluster 210. The virtual machine rightsizing system 110 may include a deployment action engine 212, a tenant manager 214, a request builder 216, and an allocation manager 218. Each of these components 212-218 may cooperatively generate and implement an action plan for transitioning a current state of a customer deployment to a goal state of the customer deployment based on information received from the central resource management system 106.

For example, the deployment action engine 212 may implement any number and types of modifications to a customer deployment. By way of example, the deployment action engine 212 may perform various acts such as deallocating instances of virtual machines, performing live-migration of virtual machines between compute cores (e.g., on the same or on different server nodes), and perform in-place modifications of one or more specifications of the virtual machine deployment(s).

In one or more embodiments, the deployment action engine 212 generates an action plan including various deployment actions for transitioning from a current state of a customer deployment to a goal state. In particular, and as will be discussed in further detail below, the deployment action engine 212 may receive a goal state from the central resource management system 106 that indicates rightsized virtual machines (or modified virtual machine specifications) that more closely align to a predicted utilization of resources by a customer deployment. Based on the goal state, the deployment action engine 212 may initiate generating an action plan by determining a series and/or specific sequence of deployment actions that may be performed in accordance with the customer subscription (and/or additional user input) to transition to the goal state (or modification of the goal state).

The virtual machine rightsizing system 110 may further include a tenant manager 214 to supplement or augment the action plan for transitioning from a current state of the customer deployment to the goal state (or some modification to the goal state based on a combination of different inputs). For example, the tenant manager 214 may receive additional information from a user and/or resource provider to augment information from the deployment action engine 212. This information may be used to further develop or generate the action plan for transitioning to a new state of the customer deployment that more closely aligns with resource utilization of the customer subscription. For instance, in one or more embodiments, the tenant manager 214 provides a front-end interface that enables an owner of the subscription to provide parameters, settings, or additional information that may be used in determining specific actions and/or overriding aspects of the action plan and/or goal state. The tenant manager 214 may further update a service model or otherwise implement changes to a template that that defines parameters and limits of the customer subscription.

As further shown, the virtual machine rightsizing system 110 may include a request builder 216. In one or more embodiments, the request builder 216 receives information from the deployment action engine 212 and the tenant manager 214 to modify the action plan and/or generate an allocation request based on the action plan. For example, in one or more embodiments, the request builder 216 receives an action plan (or generates the action plan) based on information from the deployment action engine 212 and/or tenant manager 214 and generates an allocation request in accordance with the action plan.

The virtual machine rightsizing system 110 may further include an allocation manager 218. The allocation manager 218 may receive the deployment request and determine when and where virtual machines having rightsized specifications should be deployed in accordance with the action plan. For example, the allocation manager 218 may identify groupings of compute cores and/or server nodes that are capable of hosting the rightsized virtual machines. In one or more embodiments, the allocation manager 218 implements an allocation model (e.g., a machine learning model or allocation engine) trained to selectively identify compute cores and/or server nodes to receive the rightsized virtual machines based on metrics of fragmentation in order to reduce overall fragmentation of computing resources on the cluster. In one or more embodiments, this selective allocation may be based on policies or other information received from the deployment action engine 212.

While one or more embodiments described herein refer specifically to features and functionalities of the central resource management system 106 and virtual machine rightsizing system 110 on respective devices, it will be understood that features and functionality described in connection with each of the systems 106, 110 may similarly apply to one another. For instance, one or more components of the central resource management system 106 may be implemented at the cluster level (e.g., as a sub-component of the virtual machine rightsizing system 110). Conversely, one or more components or features of the virtual machine rightsizing system 110 may be implemented on the central resource management system 106 or other centralized system that services multiple node clusters.

As further shown, the node cluster 210 may include any number and variety of server nodes. For example, the node cluster 210 may include occupied nodes 220 in which compute cores 222 have virtual machines or other services implemented thereon. The node cluster 210 may also include empty nodes 224 having no virtual machines deployed thereon. Because the empty nodes 224 have no virtual machines deployed thereon, the empty nodes 224 may be used by the resource management system 106 for a variety of applications. For instance, the empty nodes 210 may be used as a target destination for any virtual machine (e.g., rightsized virtual machines) on the node cluster 210. Moreover, the empty nodes 224 may be used to perform repairs, updates, or any other operation on the node cluster 210 where occupied or fragmented nodes may be incompatible or unavailable.

In one or more embodiments, the node cluster 210 may be required to maintain a minimum number of empty nodes 224 to ensure that the node cluster 210 is capable of supporting deployment upgrades or expansions as well as dealing with various emergency scenarios such as a server rack going down unexpectedly (e.g., due to a power outage or other service interruption event). The node cluster 210 may similarly have a target number of empty nodes corresponding to a desired number of empty nodes that ensure peak performance of the node cluster 210. In one or more embodiments, the virtual machine rightsizing system 110 determines the action plan and allocation decisions based on minimum and/or target numbers of empty nodes for the node cluster 210.

As further shown, the node cluster 210 may include a number of fragmented nodes 226. In particular, as shown in FIG. 2, the fragmented nodes 226 may include occupied compute cores 228 having virtual machines deployed thereon. In one or more embodiments, a virtual machine may be deployed on multiple compute nodes. The fragmented nodes 226 may additionally include empty cores 230 having no virtual machines deployed thereon. Where a fragmented node includes a number of empty cores capable of hosting a virtual machine, the virtual machine may be deployed to the empty cores. However, where a fragmented node includes fewer empty nodes than is needed to host a virtual machine, the virtual machine may need to be deployed to a different node, such as an empty node or another fragmented node having enough empty cores. In one or more embodiments, the virtual machine rightsizing system 110 determines the action plan and allocation decisions based on fragmentation characteristics of the fragmented nodes 226 on the node cluster 210.

Each of the components of the central resource management system 106 and the virtual machine rightsizing system 110 may be in communication with each other using any suitable communication technologies. In addition, while components of the systems 106, 110 are shown to be separate in FIG. 2, any of the components or subcomponents may be combined into fewer components, such as into a single component, or divided into more components as may serve a particular implementation. As an illustrative example, one or more features or functionalities of the goal state generator 206 may be implemented on the cluster level. Alternatively, one or more embodiments features of the deployment action engine 212 and/or tenant manager 214 may be implemented by sub-systems of the central resource management system 106.

In addition, the components of the systems 106, 110 may include hardware, software, or both. For example, the components of the systems 106, 110 may include one or more instructions stored on a computer-readable storage medium and executable by processors of one or more computing devices. When executed by the one or more processors, the computer-executable instructions of one or more computing devices (e.g., server device(s) 104, server nodes) can perform one or more methods described herein. Alternatively, the components of the systems 106, 110 may include hardware, such as a special purpose processing device to perform a certain function or group of functions. Additionally, or alternatively, the components of the systems 106, 110 may include a combination of computer-executable instructions and hardware.

Figure 3:
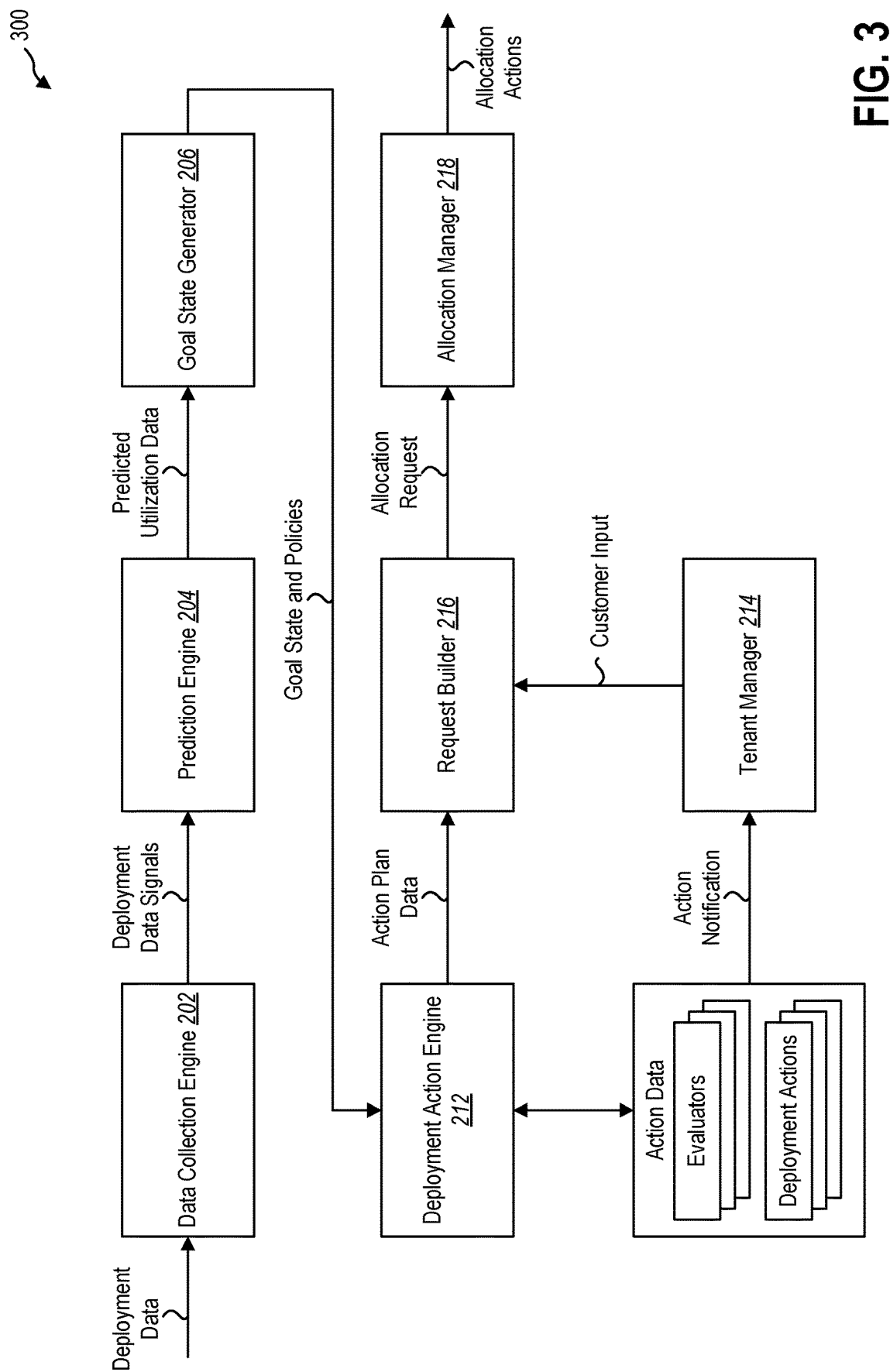
FIG. 3 illustrates an example framework for rightsizing virtual machines of a deployment in accordance with one or more embodiments.

An example implementation of the systems 106, 110 discussed above will now be discussed in connection with an example framework illustrated in FIG. 3. For example, FIG. 3 illustrates an example workflow 300 showing acts that may be performed in rightsizing a deployment of virtual machines on a node cluster such that the deployment of virtual machine instances align more closely with a current and/or predicted utilization of cloud computing resources on the node cluster. As shown in FIG. 3, the workflow 300 may include acts performed by components of the central resource management system 106 and the virtual machine rightsizing system 110.

As shown in FIG. 3, the data collection engine 202 may obtain deployment data associated with a customer subscription. The data collection engine 202 may receive or otherwise obtain access to the deployment data in a variety of ways. For example, in one or more embodiments, an agent on each server node may collect and provide real-time utilization data or information about utilization of a virtual machine thereon. The data collection engine 202 can receive and compile the utilization data associated with any number of virtual machines corresponding to a customer deployment.

Alternatively, in one or more embodiments, the cloud computing system 102 includes one or more data stores. For instance, the data collection engine 202 can access one or more datastores including raw or extrapolated data including a representation of customer deployment data over time. In one or more embodiments, the data collection engine 202 accesses one or more datastores including deployment data that has been analyzed and/or compiled to show trends of utilization over different period of time. This deployment data may include intra-day utilization data, cross-day utilization data, and may include observed or calculated trends over different increments of data (e.g., daily trends, weekly trends, gradual growth trends).

In one or more embodiments, upon receiving, accessing or otherwise obtaining the deployment data, the data collection engine 202 may generate signals to provide as input to the prediction engine 204. In one or more embodiments, the data collection engine 202 simply provides the collected deployment data as an input to the prediction engine 204. Alternatively, in one or more embodiments, the data collection engine 202 performs some pre-processing on the deployment data to generate signals having a format that the prediction engine 204 is trained to receive and further process.

As shown in FIG. 3, the data collection engine 202 can selectively provide subscription data a prediction engine 204 for further analysis. In particular, the prediction engine 204 can evaluate the subscription data to determine a predicted utilization of the customer deployment. This may involve evaluating a historical utilization of each of the virtual machines of an allocation and determining a predicted utilization for each virtual machine. In one or more embodiments, the prediction engine 204 evaluates trends across multiple virtual machines to determine average or overall utilization of virtual machine resources for a set of virtual machines associated with a customer deployment.

In one or more embodiments, determining a predicted utilization involves determining resource utilization relative to a quantity of resources allocated for a customer deployment. For example, where each virtual machine has an allocation of eight compute cores (or other predetermined number) and an analysis of the deployment data yields a prediction that only six compute cores per virtual machine are expected to be used, the prediction engine 204 can determine a metric of underutilization such as two compute cores per virtual machine, a 75% utilization relative to a maximum allocation, or other measure relative to an upper limit of resources allocated for a customer deployment. In one or more embodiments, the prediction engine 204 determines whether the predicted underutilization (or overutilization) exceeds some threshold difference between an allocated quantity of resources and the predicted utilization of resources. As mentioned above, this upper limit may be based on information from a subscription template or be based on the type or family of virtual machines that are deployed.

While one or more embodiments described herein discuss a predicted utilization for an entire deployment of virtual machines, it is noted that the prediction engine 204 may determine a predicted utilization of each individual virtual machine of a customer deployment. For instance, the prediction engine 204 may determine and generate a listing predicted utilizations for each virtual machine from a set of virtual machines to provide a more accurate representation of how resources are being used and/or an expected utilization of computing resources.

Moreover, while one or more embodiments discuss a predicted underutilization of resources, the prediction engine 204 may similarly predict an overutilization of available resources. For instance, even where a current utilization is less than an upper limit of allocated resources for a deployment of virtual machines, the prediction engine 204 may determine that customer usage is going to increase over time based on the deployment data or other information (e.g., a user input indicating an expected increase in resource utilization) and predict an overutilization of available resources. Accordingly, while one or more embodiments described herein relate to rightsizing based on a predicted underutilization or resources, similar principles may apply to a predicted overutilization of resources.

Thus, as used herein, a "predicted misallocation" or a "predicted mismatch in utilization" of allocated resources may refer to a predicted underutilization or a predicted overutilization of resources for a customer deployment. Moreover, where one or more virtual machines may be associated with a predicted underutilization of resources while one or more virtual machines (of the same customer deployment) are associated with a predicted overutilization of resources, a predicted misallocation may refer to a combination of predicted overutilization and underutilization of resources for different virtual machines of the same customer deployment.

As shown in FIG. 3, the prediction engine 204 can provide predicted utilization data to the goal state generator 206. As mentioned above, the predicted utilization data may include predicted utilization of a customer deployment as a whole and/or may include predicted utilization of individual virtual machines or virtual machines types of a customer deployment. In one or more embodiments, as an alternative to providing comprehensive prediction data to the goal state generator 206, the prediction engine may provide an indication or flag of virtual machines and/or virtual machine types that are being under or over-utilized by customer(s) associated with a customer subscription.

Based on the predicted utilization data (and based on additional deployment data), the goal state generator 206 can generate a goal state for the customer deployment. For example, the goal state generator 206 can generate a goal state including an identified set of virtual machines having rightsized specifications based on the predicted utilization data. In particular, the goal state generator 206 can identify a set of virtual machines having specifications (e.g., core allocations, processing specifications, etc.) that align more closely with the estimated utilization of computing resources than a current state of the customer deployment including a different set of virtual machines.

In accordance with one or more embodiments described herein, the goal state may include a variety of different types of rightsized specifications. For instance, in one or more embodiments, the goal state may include a modified set (e.g., a rightsized set of virtual machines) of virtual machines having a similar number of instances, but having different sizes (e.g., different numbers of compute cores per virtual machine instance). Alternatively, in one or more embodiments, the goal state may include a modified set of virtual machines having similar core sizes, but having a different number of virtual machine instances from the current state of the customer deployment. Other goal states may include a combination of different sized virtual machines as well as a different number of virtual machine instances.

As just mentioned, the goal state generator 206 may generate the goal state by identifying a new or different set of virtual machines from an existing set of virtual machines deployed on the cloud computing system 102. In one or more embodiments, the goal state generator 206 queries stored or otherwise available virtual machine data (e.g., on the data storage 208) that includes a plurality of virtual machine types that may be deployed on a node cluster or other network of server nodes that are capable of providing services to a customer associated with the customer subscription.

As an example, the goal state generator 206 may access a listing of all different types of virtual machines that may be deployed on a given node cluster. For example, the goal state generator 206 may include listings of different virtual machine families, which may include groupings of virtual machines having different specifications. For instance, the different virtual machine families may correspond to virtual machines of different sizes (e.g., based on a number compute cores that are allocated for deployment of the virtual machines), virtual machines having different hardware (e.g., different graphics hardware), virtual machines having increased network or processing bandwidth, or any combination of different specifications.

The plurality of virtual machines may also be associated with compatibility data that indicates which of the virtual machines are compatible with specific services, server nodes (e.g., generations of server nodes), and/or interchangeable with one another. For example, where a virtual machine family may align more closely with a number of compute cores being utilized by virtual machines of a customer deployment, one or more additional specifications of the virtual machine family may be incompatible with services provided by the customer deployment. As a result, the goal state generator 206 may selectively identify a virtual machine from a subset of compatible or interchangeable virtual machines from a collection of deployable virtual machines in determining the goal state for the customer deployment.

While one or more embodiments described herein involve generating a goal state based on a predicted mismatch in utilization of resources on the cloud computing system (e.g., a threshold difference in predicted utilization and allocated resources, such as a threshold difference in number of compute cores), the goal state generator 206 may generate a goal state in response to a number of different (or combination of) trigger conditions. As an example, in one or more embodiments, the goal state generator 206 may periodically determine whether a predicted utilization of resources for a customer deployment aligns more closely with virtual machines from a list of available virtual machines, even where a predicted utilization is not significantly mismatched from a current utilization of resources.

In one or more embodiments, the goal state generator 206 may generate a goal state based on identifying that a new type or family of virtual machines has been made available for deployment on a node cluster. This new type or generation of virtual machine may provide enhanced functionality or simply align closer to a predicted utilization of resources than a current deployment. In response to identifying the new virtual machine type, the goal state generator 206 may generate the goal state including a set of one or more virtual machines of the new virtual machine type rather than virtual machines in use by an existing deployment.

As another example, in one or more embodiments, the goal state generator 206 may identify that a new generation of hardware has been added to an existing network of devices. This new generation of hardware may include additional cores, better performing cores, enhanced functionality generally, and/or may provide the capability to host additional virtual machine types that were previously incompatible or unavailable to a customer deployment.

In one or more embodiments, the goal state generator 206 may generate goal states based on fragmentation characteristics of an existing deployment. For instance, where utilization on a node cluster becomes fragmented as a result of other deployments expiring, decreasing, or being decommissioned, the goal state generator 206 may determine based on a combination of predicted utilization and deployment data that an updated goal state simply enables consolidation of virtual machines on server nodes in a way that reduces fragmentation of resources on the node cluster and improved functionality of the node cluster as a whole.

As shown in FIG. 3, the goal state generator 206 can provide the goal state and policies to the deployment action engine 212 for use in initiating a transition between a current state of a customer deployment and the goal state. In one or more embodiments, the goal state generator 206 selectively provides goal states or other indicators of customer deployments for which a mismatched utilization (or other trigger condition(s)) has been identified. For example, in one or more embodiments, the goal state generator 206 provides tags for specific virtual machines or customer deployment associated with a predicted mismatch in utilization of allocated resources. These tags may signal to the deployment action engine 212 to take a closer look at and locally determine whether the current deployment should be transitioned to the goal state.

Upon receiving the goal state and becoming aware of the predicted mismatch in utilization for a customer deployment, the deployment action engine 212 may perform a number of actions to initiate rightsizing virtual machines of an existing deployment. For example, based on the goal state, which may include an identification of different virtual machine types, the deployment action engine 212 may determine one or more deployment actions that may be performed as part of the process for modifying the customer deployment.

For example, in one or more embodiments, the deployment action engine 212 may analyze a number of triggers and evaluators. This may include identifying or determining evaluators such as a customer intent, offer-type, efficiency, and packing density or fragmentation on the node cluster. These evaluators may be parameters or inputs to a machine learning model implemented on the deployment action engine 212 that the deployment action engine 212 may consider in determining specific deployment actions to perform as part of the process for transitioning between a current state and the goal state. In one or more embodiments, the deployment action engine 212 considers a customer type (e.g., internal v. external customer) or other customer-specific policies from the customer subscription to determine deployment actions that can be performed as part of an action plan.

In one or more embodiments, the deployment action engine 212 considers a number of evaluators and policies in determining specific deployment actions. For example, certain deployment actions may have varying levels of impact. In addition, certain deployment actions may involve instance level of instance count rightsizing. As an example, a service model change may involve instance count rightsizing and have a significant customer impact (e.g., cause an interruption in services). As another example, a live migration may involve instance-level rightsizing and have a significant customer impact. As a further example, an in-place action or a pause may involve instance-level rightsizing and have a low impact.

As illustrative examples, where a goal state (or customer request) indicated a desire for five virtual machine instances associated with an allocation of eight cores and fifty GB of GPU memory, the deployment action engine 212 may determine to dynamically modify a service model using an instance-count rightsizing action. Alternatively, for an instance-level rightsizing action, the deployment action engine 212 may determine that live-migration to a different virtual machine family should be performed. Accordingly, the deployment action engine 212 may decide between different actions in transitioning the deployment from a current state to a goal state. The specific actions may be determined based on predicted impact, compatibility with corresponding services, and/or policy data associated with the customer subscription, which may be accessed by the deployment action engine 212 and/or received in conjunction with the goal state.

As further shown, the deployment action engine 212 may draw from a number of deployment actions that the deployment action engine 212 is configured to implement. As an example, the deployment action engine 212 may implement a deallocation action that involves deallocating instances of a first set of virtual machines and reallocating instances based on the rightsized specifications. As another example, the deployment action engine 212 can implement an oversubscription action that involves oversubscribing one or more compute cores from a set of compute cores such that one or more compute cores become available for allocation to virtual machines of the customer subscription. Oversubscribing may refer to a mechanism of adding virtual cores or physical cores to a customer deployment. As another example, the deployment action engine 212 may implement live-migration that involve live-migrating instances of a first set of virtual machines from a first set of compute cores to a second set of compute cores (on a different or the same server node) based on the rightsized specifications.

In each of the above actions, the deployment action engine 212 may identify actions that involve modifying a state or nature of the virtual machines of the customer deployment. For example, the deployment action engine 212 may identify and implement actions that involve changing a core size or other specification of the virtual machines from a first size or specification to a second (different) size or specification. In one or more embodiments, the deployment action engine 212 identifies and implements actions that involve changing a virtual machine family or virtual machine type from a first family or type to a second family or type.

The deployment action engine 212 may identify any number of deployment actions. In one or more embodiments, the deployment action engine 212 may identify a specific sequence of deployment actions to maintain compatibility with a current deployment. For instance, the deployment action engine 212 can identify specific actions and a sequence of actions such that a transition from the current state to the goal state adheres to a fault domain of the customer deployment throughout the transition between the current state and the goal state.

As shown in FIG. 3, action plan data may be provided to a request builder 216. In addition, an action notification may be provided to a tenant manager 214. As discussed above, the tenant manager 214 may include a front-end interface that enables a customer to provide additional input for modifying a goal state and/or action plan associated with modifying an existing virtual machine deployment. For example, the tenant manager 214 may receive input indicating a customer intent or customer request associated with modifying a deployment and/or opting in or out of certain policies.

For example, in one or more embodiments, the tenant manager 214 acts as an enrichment mechanism for augmenting or supplementing the action plan data generated by the deployment action engine 212. For example, with dynamic changes like oversubscription and rightsizing the tenant manager 214 may enable merging of request building from multiple sources such as the central resource management system 106, the deployment action engine 212, or the allocation manager 218 to enable receipt of allocation constraints from multiple sources. In one or more embodiments, the tenant manager 214 provides a mechanism for receiving a preference to provide overrides in terms of tags or metadata from different sources persisted with deployment data (e.g., including customer data and/or resource data).

As shown in FIG. 3, the request builder 216 may receive the action plan data and customer input(s) and generate an allocation request. The allocation request may be based on a combination of the generated action plan and the customer inputs. For example, in one or more embodiments, the request builder 216 receives a user input indicating a request for a quantity of resources (or other specification) that differs from a quantity of resources allocated for the current deployment of virtual machines. In response, the request builder 216 may modify an action plan or the goal state based on a combination of the goal state received from the server device and the received input.

As shown in FIG. 3, the request builder 216 can provide an allocation request to an allocation manager 218. The allocation manager 218 may determine a specific placement for each virtual machine (e.g., destination nodes) as well as a mechanism and timing for deploying the rightsized virtual machines. The mechanism employed by the allocation manager 218 may depend on the indicated actions from the action plan. For example, where an action is live-migration, the allocation manager 218 may identify a specific server node and/or a time for implementing live-migration that would decrease a potential negative impact of the deployment action.

In one or more embodiments, the allocation manager 218 implements a gradual transition between the deployment states. For example, rather than aggressively re-allocating resources and causing virtual machines to be redeployed all at once (potentially causing a significant interruption), the allocation manager 218 may gradually allocate and cause virtual machines to be deployed. For instance, the allocation manager 218 may re-allocate a predetermined percentage of resources at once. In one or more embodiments, the allocation manager 218 implements the gradual allocation of resources to adhere to fault domain rules and to provide uninterrupted service to customers of a deployment.

As shown in FIG. 3, the workflow 300 may involve an iterative or dynamic process that involves multiple iterations of modifying a deployment associated with a customer subscription. For instance, as shown in FIG. 3, the allocation manager 218 (or other module) may provide updated deployment data that indicates the modifications implemented to the customer deployment. The components of the workflow 300 may then iteratively determine whether a trigger event occurs that causes a new goal state to be generated and provided to the deployment action engine 212 for further processing in accordance with one or more embodiments.

In one or more embodiments, the workflow may additionally include providing a notification to a customer associated with a customer deployment. For instance, based on the modified deployment, the virtual machine rightsizing system 110 (e.g., the tenant manager 214) can provide a notification to a customer of the changes to the customer subscription. In one or more embodiments, the virtual machine rightsizing system 110 provides a notification indicating a change after the change has been implemented. For example, after transitioning between the current state and the goal state, the virtual machine rightsizing system 110 may generate a notification including any information associated with the change in subscription, which may include an identified change in virtual machine type, a change in number of virtual machine instances, changes in billing information, and/or other modification to the subscription.

Alternatively, in one or more embodiments, the virtual machine rightsizing system 110 provides a notification to the customer of the proposed change prior to implementing the change(s) to the customer subscription. For example, in one or more embodiments, the virtual machine rightsizing system 110 provides a notification including information about the proposed change(s) to the customer subscription and may indicate a change in billing based on the change(s). In one or more embodiments, the customer may opt-in or opt-out of rightsizing features by interacting with the tenant manager 214.

Moreover, in one or more embodiments, the virtual machine rightsizing system 110 enables a customer to opt-in or out of rightsizing prior to receiving the notification and/or prior to performing some or all of the acts illustrated in FIG. 3. For example, in one or more embodiments, a customer may select an option as part of a deployment template or other selectable option in which the customer opts-in or out of rightsizing. For example, a customer may indicate a preference to automatically perform rightsizing with or without approval by the customer. The customer may indicate a preference to perform rightsizing only after approval of a received notification. The customer may indicate a preference to not perform rightsizing unless specifically requested by the customer.

Figure 4A:
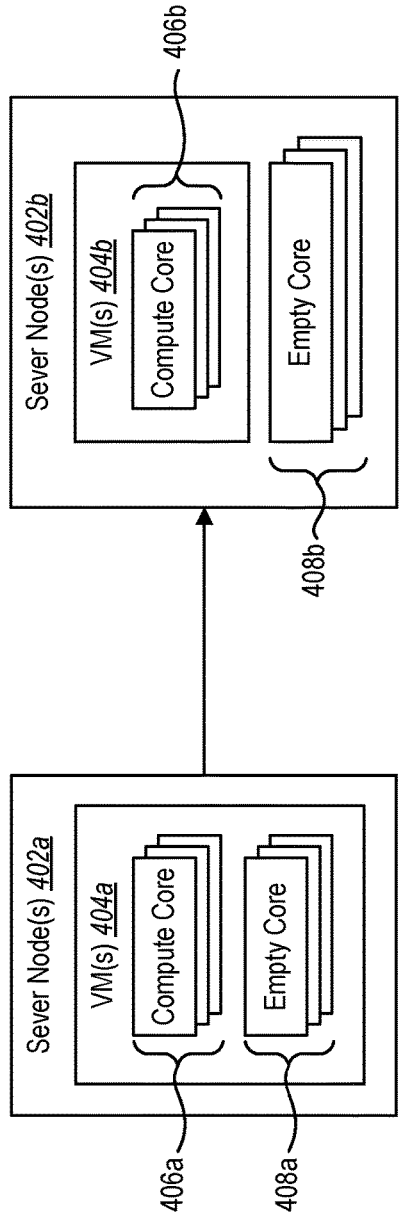
FIGS. 4A-4C illustrate example implementations of rightsized deployments in accordance with one or more embodiments.
Figure 4B:
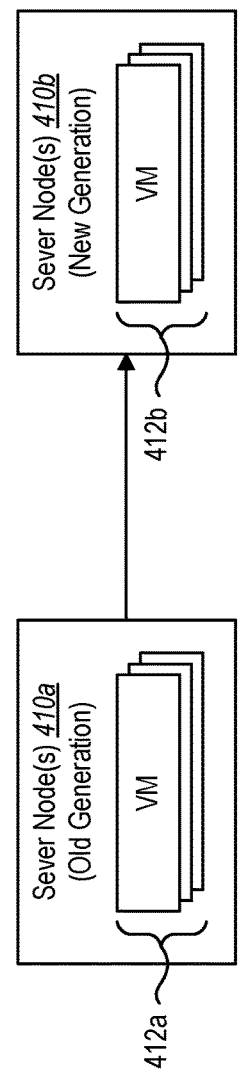
Figure 4C:
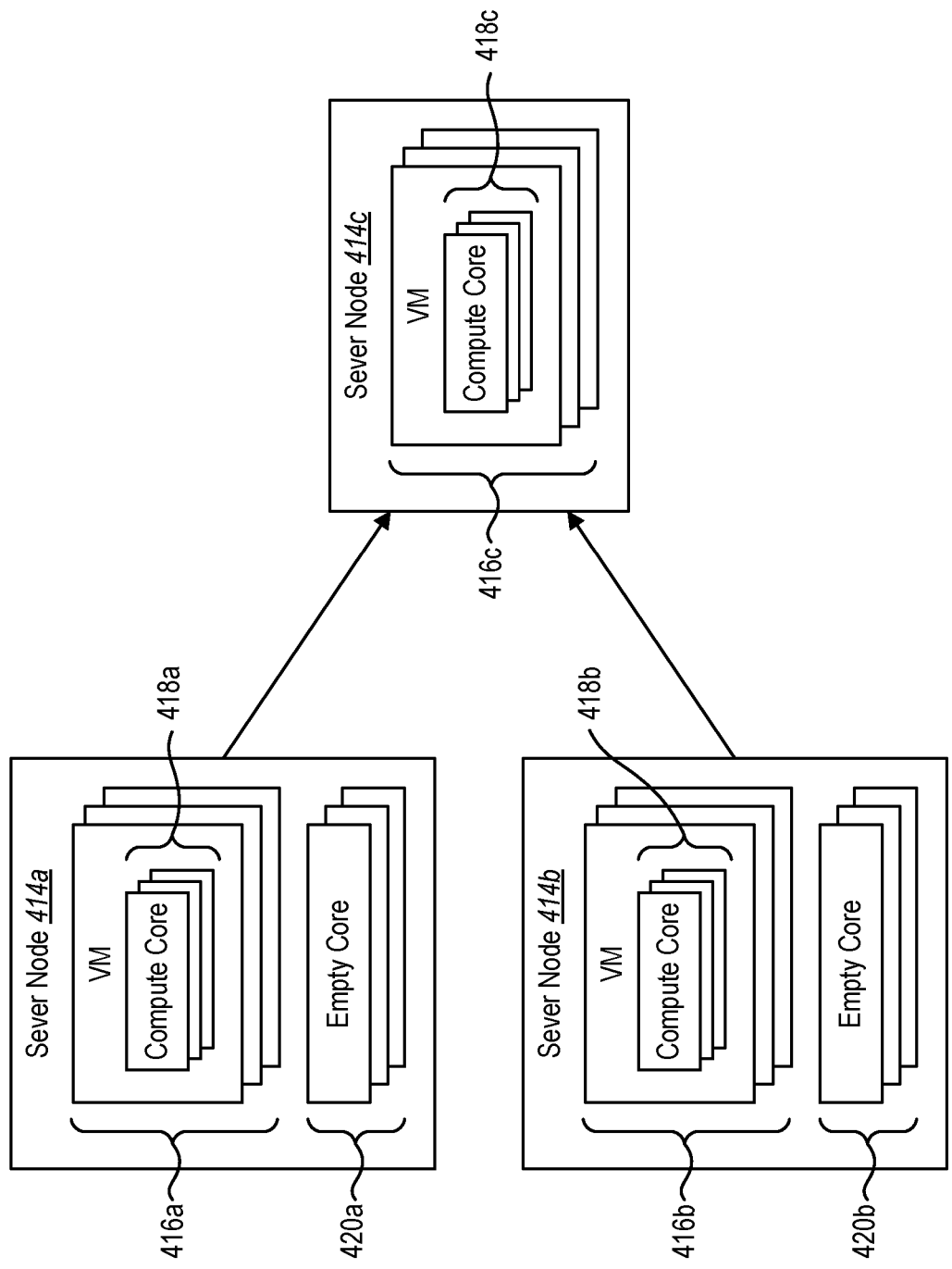

As mentioned above, the central resource management system 106 and the virtual machine rightsizing system 110 may generate a goal state based on a variety of trigger conditions as well as perform a variety of deployment actions based on a variety of considerations. As a result, transitions between a current state for a deployment and a goal state for the deployment may differ significantly between different implementations of virtual machines. FIGS. 4A-4C provide some example implementations in which a variety of deployment actions may be performed as part of the process for transitioning between a current state and a goal state.

For example, FIG. 4A illustrates an example in which a current state of a customer deployment includes a first server node 402a having a virtual machine 404a thereon and which has an allocation of five compute cores. In this example, the virtual machine 404a has a current or predicted utilization of three compute cores of the upper limit of five compute cores allocated to the virtual machine 404a. As shown in FIG. 4A, the virtual machine 404a has a number of occupied cores 406a and a number of empty cores 408a corresponding to the observed or predicted utilization of the virtual machine 404a.

As shown in FIG. 4A, the virtual machine rightsizing system 110 may cause a deployment of a first size of virtual machine 404a (e.g., corresponding to a first virtual machine type or family) to transition to a second size of a virtual machine 404b (e.g., corresponding to a second virtual machine type or family). In particular, as shown in FIG. 4A, the updated state of the deployment may include a virtual machine 404b on a second server node 402b having an allocation of three compute cores (rather than five). As shown in FIG. 4B, the second server node 402b includes three occupied cores 406b allocated to or otherwise in use by the virtual machine 404b and additional empty cores 408b that are available for deployment to one or more additional virtual machines.

The specific actions for transitioning between the first state and the second state shown in FIG. 4A may depend on various factors and policies. For example, the deployment action engine 212 may identify specific deployment actions based on customer input and/or information received in connection with the goal state to determine a specific set and sequence of actions to perform in transitioning between the different states. Moreover, while FIG. 4A shows an example in which the virtual machines 404a-b are deployed on different server nodes 402a-b, one or more implementations may involve simply changing the types or families of the virtual machines 404a-b to the respective sizes without causing the virtual machines 404a-b to be deployed on different server nodes 402a-b.

FIG. 4B illustrates another example in which a current state of a customer deployment is transitioned to a goal state based on another trigger condition. For example, FIG. 4B illustrates a first server 410a having a first set of virtual machines 412a thereon corresponding to a current state of a customer deployment and a second server 410b having a second set of virtual machines 412b thereon corresponding to a goal state of the customer deployment. In this example, the first server 410a may refer to an older generation of hardware while the second server 410b refers to a new generation of hardware recently made available on a node cluster. In accordance with one or more embodiments discussed above, the central resource management system 106 may generate and provide the goal state to the virtual machine rightsizing system 110 based on identifying availability of the second server 410b corresponding to a new generation of hardware.

FIG. 4C provides another example implementation in which a current state of customer deployment is transitioned to a goal state based on another trigger condition. For example, FIG. 4C illustrates an example implementation of a current state of a deployment that includes first and second server nodes 414a-b having sets of virtual machines 416a-b thereon hosted using occupied compute cores 418a-b in use by the virtual machines 416a-b. In this example, the server nodes 414a-b have fragmented capacity due to the allocation and size of the virtual machines 416a-b. For example, each of the first and second server nodes 414a-b may have empty cores 420a-b that are not currently allocated for hosting any virtual machines. In one or more embodiments, the virtual machines 416a-b are implemented on the different server nodes 414a-b. This may be a result of the empty cores 420a-b being previously occupied (e.g., by another virtual machine) and/or because the virtual machines 416a-b are allocated or otherwise require a number of compute cores that prevents full utilization of computing resources on the respective server nodes 414a-b.

In this example, the central resource management system 106 may generate a goal state based on this fragmented capacity (e.g., in combination with other factors). Based on the goal state, the virtual machine rightsizing system 110 may cause the virtual machines to live-migrate or otherwise be deployed on a third server node using a different virtual machine 416c of a different size or family. The virtual machines 416c may utilize a different number of cores 418c based on predicted utilization of the customer deployment. Regardless of whether the virtual machines are a different size, however, the virtual machine rightsizing system 110 may identify and implement specific actions that consolidate the virtual machines 416c on the same server node 414c in a way that reduces fragmentation on a node cluster.

Figure 5:
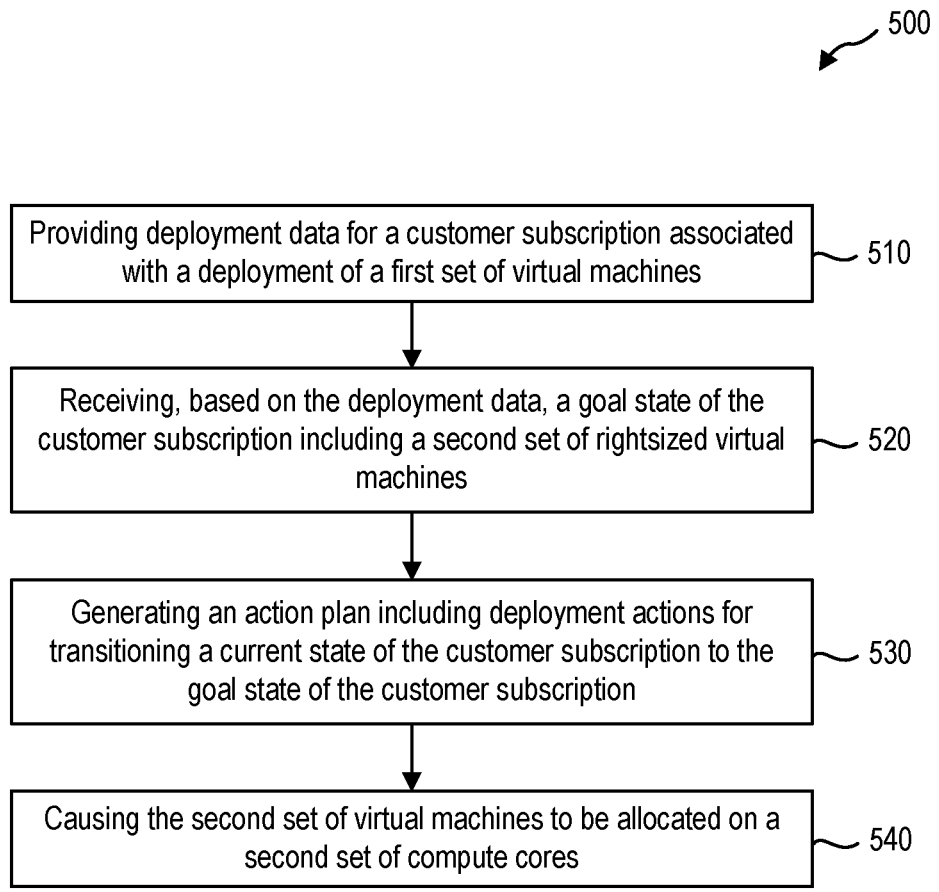
FIG. 5 illustrates a series of acts for rightsizing a deployment of virtual machines in accordance with one or more embodiments.
Figure 6:
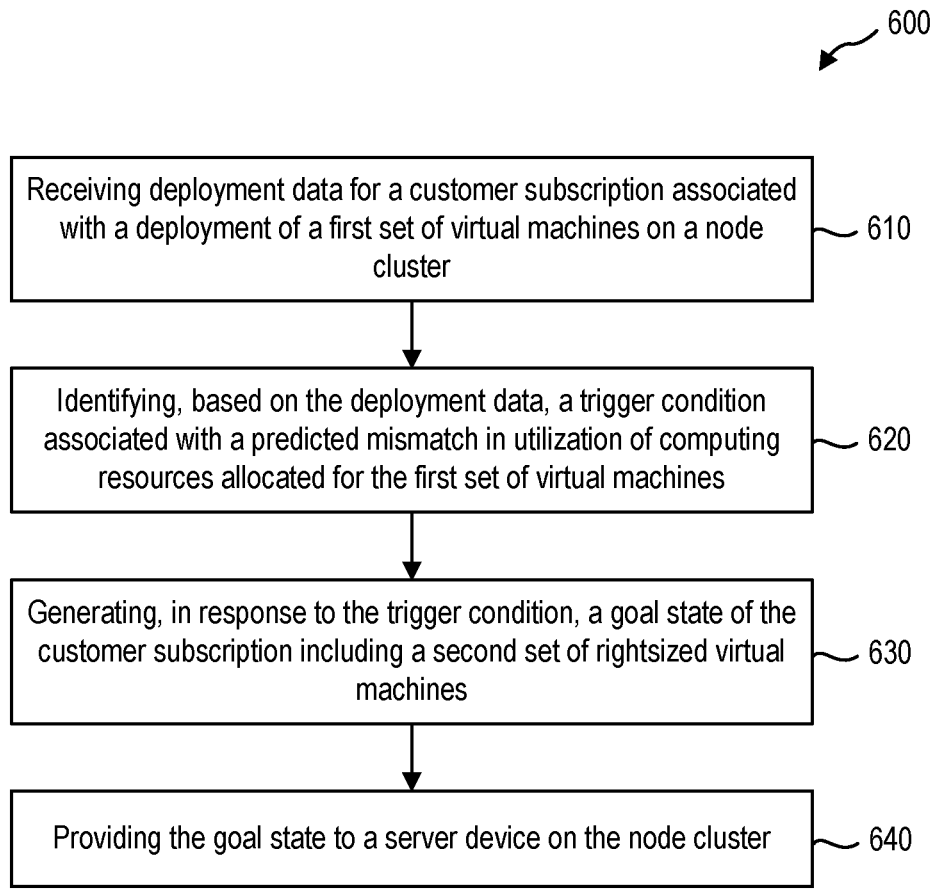
FIG. 6 illustrates a series of acts for generating a goal state for use in rightsizing a deployment of virtual machines in accordance with one or more embodiments.

Turning now to FIGS. 5-6, these figures illustrate example flowcharts including series of acts for rightsizing a deployment of virtual machines on a cloud computing system. While FIGS. 5-6 illustrate acts according to one or more embodiments, alternative embodiments may omit, add to, reorder, and/or modify any of the acts shown in FIGS. 5-6. The acts of FIGS. 5-6 can be performed as part of a method. Alternatively, a non-transitory computer-readable medium can include instructions that, when executed by one or more processors, cause a computing device (e.g., a server device) to perform the acts of FIGS. 5-6. In still further embodiments, a system can perform the acts of FIGS. 5-6.

FIG. 5 illustrates a series of acts 500 related to rightsizing a deployment of virtual machines. The series of acts 500 may include an act 510 of providing deployment data for a customer subscription associated with a deployment of a first set of virtual machines. For example, in one or more embodiments, the act 510 involves providing, to a server device, deployment data for a customer subscription associated with a deployment of a first set of virtual machines on a cloud computing system where the first set of virtual machines are implemented on a first set of compute cores and configured to provide one or more services of the customer subscription.

As further shown, the series of acts 500 may include an act 520 of receiving, based on the deployment data, a goal state of the customer subscription including a second set of rightsized virtual machines. For example, in one or more embodiments, the act 520 involves receiving, from the server device, a goal state of the customer subscription based on the deployment data where the goal state includes a second set of virtual machines having rightsized specifications based on the deployment data and capable of providing the one or more services of the customer subscription.

In one or more embodiments, the first set of virtual machines includes virtual machines of a first virtual machine family associated with a first set of virtual machine specifications. The second set of virtual machines may include virtual machines of a second virtual machine family associated with a second set of virtual machine specifications. The first set of virtual machine specifications may include a first number of compute cores and the second set of virtual machine specifications may include a second number of compute cores. In one or more embodiments, the rightsized specifications indicate the second number of compute cores based on a predicted utilization of cloud computing resources of the customer subscription where the predicted utilization of cloud computing resources is based on the deployment data.

As further shown, the series of acts 500 includes an act 530 of generating an action plan including deployment actions for transitioning a current state of the customer subscription to the goal state of the customer subscription. For example, in one or more embodiments, the act 530 involves generating an action plan including a set of deployment actions for transitioning a current state of the customer subscription including the first set of virtual machines to the goal state of the customer subscription including the second set of virtual machines. In one or more embodiments, the action plan includes sequence and timing data for the set of deployment actions such that a transition from the current state of the deployment of the first set of virtual machines to the goal state of the deployment adheres to a fault domain of the deployment throughout the transition between the current state and the goal state.

In one or more embodiments, the goal state includes the second set of virtual machines having the rightsized specifications selected based on a predicted utilization of computing resources by one or more customers associated with the customer subscription. In one or more embodiments, generating the action plan includes receiving a user input indicating a request for a quantity of resources that differs from a quantity of resources allocated for the first set of virtual machines. Generating the action plan may further include modifying the goal state based on a combination of the goal state received from the server device and the received user input.

In one or more embodiments, generating the action plan includes identifying the set of deployment actions from a plurality of predefined actions. For example, the plurality of predefined actions may include deallocating instances of the first set of virtual machines and reallocating the instances based on the rightsized specifications. The predefined actions may also include oversubscribing one or more compute cores from the first set of compute cores such that the one or more compute cores become available for allocation to one or more additional virtual machines. The predefined actions may also include live-migrating instances of the first set of virtual machines from the first set of compute cores on a first one or more server nodes to a second set of compute cores on a second one or more server nodes based on the rightsized specifications.

As further shown, the act 500 includes an act 540 of causing the second set of virtual machines to be allocated on a second set of compute cores. For example, in one or more embodiments, the act 540 involves causing the second set of virtual machines to be allocated on a second set of compute cores (e.g., on the same or different server nodes of the cloud computing system) based on the action plan.

In one or more embodiments, causing the second set of virtual machines to be allocated includes providing the action plan to an allocation engine trained to identify one or more destination nodes including the second set of compute cores based on a metric of fragmentation for the node cluster associated with deploying the second set of virtual machines on the one or more destination nodes. In one or more embodiments, causing the second set of virtual machines to be allocated on the second set of compute cores is performed while providing access to the one or more services to one or more customers associated with the customer subscription.

FIG. 6 illustrates another example series of acts 600 related to rightsizing a customer deployment of virtual machines. As shown in FIG. 6, the series of acts 600 may include an act 610 of receiving deployment data for a customer subscription associated with a deployment of a first set of virtual machines on a node cluster. For example, in one or more embodiments, the act 610 involves receiving deployment data for a customer subscription associated with a deployment of a first set of virtual machines on a node cluster of a cloud computing system where the first set of virtual machine is implemented on a first set of server nodes of the node cluster and configured to provide one or more services of a customer subscription.

As further shown, the series of acts 600 may include an act 620 of identifying, based on the deployment data, a trigger condition associated with a predicted mismatch in utilization of computing resources allocated for the first set of virtual machines. For example, in one or more embodiments, the act 620 involves identifying, based on the deployment data, a trigger condition associated with a predicted mismatch in utilization of available computing resources allocated for the first set of virtual machines in accordance with the customer subscription.

As further shown, the series of acts 600 may include an act 630 of generating, in response to the trigger condition, a goal state of the customer subscription including a second set of rightsized virtual machines. For example, in one or more embodiments, the act 630 involves generating a goal state of the customer subscription based on the deployment data where the goal state includes a second set of virtual machines having rightsized specifications based on the deployment data and capable of providing the one or more services of the customer subscription. In one or more embodiments, the first set of virtual machines includes virtual machines of a first virtual machine family associated with a first set of virtual machine specifications. In one or more embodiments, the second set of virtual machines includes virtual machines of a second virtual machine family associated with a second set of virtual machine specifications.

In one or more embodiments, generating the goal state includes identifying the second set of virtual machines from a plurality of pre-configured virtual machines available for deployment on the node cluster. In one or more embodiments, the plurality of virtual machines includes a subset of virtual machine types available for deployment on the node cluster based on a determined compatibility of the plurality of pre-configured virtual machines with the first set of virtual machines in hosting the one or more services of the customer subscription.

As further shown, the series of acts 600 may include an act 640 of providing the goal state to a server device on the node cluster. For example, in one or more embodiments, the act 640 involves providing the goal state to a server device on the node cluster where providing the goal state to the server device causes a transition from a current state of the customer subscription including the first set of virtual machines to the goal state of the customer subscription including the second set of virtual machines.

In one or more embodiments, the series of acts 600 includes generating a predicted utilization of computing resources on the node cluster of the cloud computing system based on the deployment data. In one or more embodiments, identifying the trigger condition includes determining that the first set of virtual machines utilizes a number of compute cores that is less than a maximum number of compute cores allocated for the first set of virtual machines (e.g., by a threshold number of compute cores).

In one or more embodiments, the series of acts 600 includes receiving an indication that a new generation of hardware has been added to the node cluster of the cloud computing system. In one or more embodiments, identifying the trigger condition is based on the new generation of hardware being added to the node cluster of the cloud computing system. In one or more embodiments, identifying the trigger condition includes estimating that the deployment of the first set of virtual machines will result in the predicted mismatch in utilization of available computing resources relative to a deployment on the second set of virtual machines based on the rightsized specifications of the second set of virtual machines.

Figure 7:
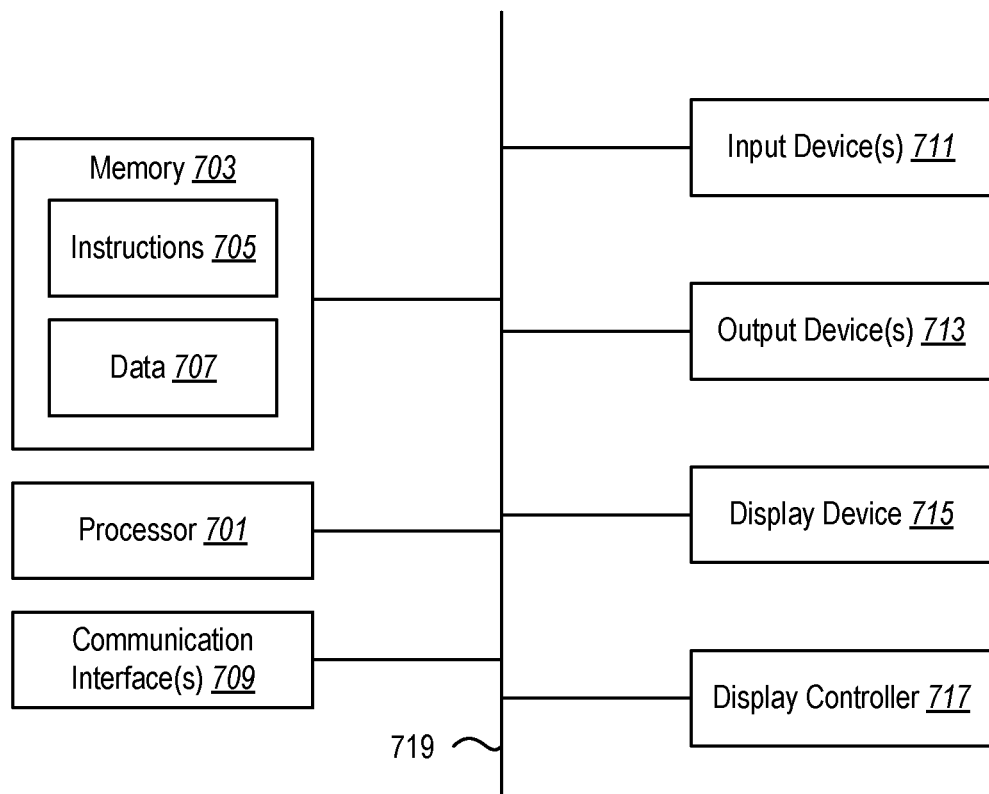
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
    one or more processors;
    memory in electronic communication with the one or more processors; and
    instructions stored in memory, the instructions being executable by the one or more processors to:
       provide, to a server device, deployment data for a deployment of a first set of virtual machines on a cloud computing system, wherein the first set of virtual machines are implemented on a first set of compute cores on a first server node and a second set of compute cores on a second server node and configured to provide one or more services of a customer subscription;
       receive, from the server device, a goal state of the deployment based on the deployment data, the goal state including a second set of virtual machines having rightsized specifications based on the deployment data and capable of providing the one or more services of the customer subscription;
       based on the deployment data, generate an action plan including a set of deployment actions for transitioning a current state of the deployment of the first set of virtual machines to the goal state of the deployment including the second set of virtual machines, wherein generating the action plan includes determining a third set of compute cores on a third server node for the goal state of the customer subscription; and
       cause the second set of virtual machines to be allocated on the third set of compute cores on the third server node based on the action plan, wherein carrying out the action plan results in the first server node being a first empty server node having a first empty set of compute cores and the second server node being a second empty server node having a second empty set of compute cores.

2. The system of claim 1,
    wherein the first set of virtual machines comprises virtual machines of a first virtual machine family associated with a first set of virtual machine specifications, and
    wherein the second set of virtual machines comprises virtual machines of a second virtual machine family associated with a second set of virtual machine specifications.

3. The system of claim 2, wherein the first set of virtual machine specifications is hosted by a first number of compute cores and the second set of virtual machine specifications is hosted by a second number of compute cores, and wherein the rightsized specifications indicate the second number of compute cores based on a predicted utilization of cloud computing resources of the customer subscription, the predicted utilization of cloud computing resources being based on the deployment data.

4. The system of claim 1,
    wherein the goal state comprises the second set of virtual machines having the rightsized specifications selected based on a predicted utilization of computing resources by one or more customers associated with the customer subscription, and
    wherein generating the action plan comprises:
       receiving a user input indicating a request for a quantity of resources that differs from a quantity of resources allocated for the first set of virtual machines; and
       modifying the goal state based on a combination of the goal state received from the server device and the received user input.

5. The system of claim 1, wherein generating the action plan comprises identifying the set of deployment actions from a plurality of predefined actions, the plurality of predefined actions including one or more of:
    deallocating instances of the first set of virtual machines and reallocating the instances based on the rightsized specifications; or
    live-migrating instances of the first set of virtual machines from the first set of compute cores on the first server node and the second set of compute cores on the second server node to the third set of compute cores on the third server node based on the rightsized specifications.

6. The system of claim 1, wherein the action plan includes sequence and timing data for the set of deployment actions such that a transition from the current state of the deployment of the first set of virtual machines to the goal state of the deployment adheres to a fault domain of the deployment throughout the transition between the current state and the goal state.

7. The system of claim 1, wherein the action plan is determined based on fragmentation characteristics of a grouping of server nodes including the first server node and the second server node.

8. The system of claim 7, wherein the action plan is further determined based on a target number of empty server nodes within the grouping of server nodes, each empty server node including an empty set of compute cores having no virtual machines deployed thereon.

9. A non-transitory computer readable medium storing instructions thereon that, when executed by at least one processor, causes a computing device to:
    provide, to a server device, deployment data for a deployment of a first set of virtual machines on a cloud computing system, wherein the first set of virtual machines are implemented on a first set of compute cores on a first server node and a second set of compute cores on a second server node and configured to provide one or more services of a customer subscription;
    receive, from the server device, a goal state of the deployment based on the deployment data, the goal state including a second set of virtual machines having rightsized specifications based on the deployment data and capable of providing the one or more services of the customer subscription;

based on the deployment data, generate an action plan including a set of deployment actions for transitioning a current state of the deployment of the first set of virtual machines to the goal state of the deployment including the second set of virtual machines, wherein generating the action plan includes determining a third set of compute cores on a third server node for the goal state of the customer subscription; and cause the second set of virtual machines to be allocated on the third set of compute cores on the third server node based on the action plan, wherein carrying out the action plan results in the first server node being a first empty server node having a first empty set of compute cores and the second server node being a second empty server node having a second empty set of compute cores.

10. The non-transitory computer readable medium of claim 9, wherein the action plan is determined based on fragmentation characteristics of a grouping of server nodes including the first server node and the second server node, and wherein the action plan is determined based on fragmentation characteristics of a grouping of server nodes including the first server node and the second server node.

11. A method, comprising:
providing, to a server device, deployment data for a deployment of a first set of virtual machines on a cloud computing system, wherein the first set of virtual machines are implemented on a first set of compute cores on a first server node and a second set of compute cores on a second server node and configured to provide one or more services of a customer subscription;

receive, from the server device, a goal state of the deployment based on the deployment data, the goal state including a second set of virtual machines having rightsized specifications based on the deployment data and capable of providing the one or more services of the customer subscription;

based on the deployment data, generate an action plan including a set of deployment actions for transitioning a current state of the deployment of the first set of virtual machines to the goal state of the deployment including the second set of virtual machines, wherein generating the action plan includes determining a third set of compute cores on a third server node for the goal state of the customer subscription; and cause the second set of virtual machines to be allocated on the third set of compute cores on the third server node based on the action plan, wherein carrying out the action plan results in the first server node being a first empty server node having a first empty set of compute cores and the second server node being a second empty server node having a second empty set of compute cores.

12. The method of claim 11,
wherein the first set of virtual machines comprises virtual machines of a first virtual machine family associated with a first set of virtual machine specifications, and
wherein the second set of virtual machines comprises virtual machines of a second virtual machine family associated with a second set of virtual machine specifications.

13. The method of claim 12, wherein the first set of virtual machine specifications is hosted by a first number of compute cores and the second set of virtual machine specifications is hosted by a second number of compute cores, and wherein the rightsized specifications indicate the second number of compute cores based on a predicted utilization of cloud computing resources of the customer subscription, the predicted utilization of cloud computing resources being based on the deployment data.

14. The method of claim 11,
wherein the goal state comprises the second set of virtual machines having the rightsized specifications selected based on a predicted utilization of computing resources by one or more customers associated with the customer subscription, and
wherein generating the action plan comprises:
receiving a user input indicating a request for a quantity of resources that differs from a quantity of resources allocated for the first set of virtual machines; and
modifying the goal state based on a combination of the goal state received from the server device and the received user input.

15. The method of claim 11, wherein generating the action plan comprises identifying the set of deployment actions from a plurality of predefined actions, the plurality of predefined actions including one or more of:
deallocating instances of the first set of virtual machines and reallocating the instances based on the rightsized specifications; or
live-migrating instances of the first set of virtual machines from the first set of compute cores on the first server node and the second set of compute cores on the second server node to the third set of compute cores on the third server node based on the rightsized specifications.

16. The method of claim 11, wherein the action plan includes sequence and timing data for the set of deployment actions such that a transition from the current state of the deployment of the first set of virtual machines to the goal state of the deployment adheres to a fault domain of the deployment throughout the transition between the current state and the goal state.

17. The method of claim 11, wherein causing the second set of virtual machines to be allocated comprises providing the action plan to an allocation engine trained to identify one or more destination nodes including the second set of compute cores based on a metric of fragmentation for a node cluster associated with deploying the second set of virtual machines on the one or more destination nodes.

18. The method of claim 11, wherein causing the second set of virtual machines to be allocated on the third set of compute cores is performed while providing access to the one or more services to one or more customers associated with the customer subscription.

19. The method of claim 11, wherein the action plan is determined based on fragmentation characteristics of a grouping of server nodes including the first server node and the second server node.

20. The method of claim 19, wherein the action plan is further determined based on a target number of empty server nodes within the grouping of server nodes, each empty server node including an empty set of compute cores having no virtual machines deployed thereon.

* * * * *